United States Patent
De Bruijn et al.

(10) Patent No.: US 11,856,386 B2
(45) Date of Patent: Dec. 26, 2023

(54) APPARATUS AND METHOD FOR PROCESSING AUDIOVISUAL DATA

(71) Applicant: KONINKLIJKE PHILIPS N.V., Eindhoven (NL)

(72) Inventors: Werner Paulus Josephus De Bruijn, Utrecht (SE); Jeroen Gerardus Henricus Koppens, Nederweert (NL)

(73) Assignee: Koninklijke Philips N.V., Eindhoven (NL)

( * ) Notice: Subject to any disclaimer, the term of this patent is extended or adjusted under 35 U.S.C. 154(b) by 359 days.

(21) Appl. No.: 17/275,217

(22) PCT Filed: Sep. 10, 2019

(86) PCT No.: PCT/EP2019/074046
§ 371 (c)(1),
(2) Date: Mar. 11, 2021

(87) PCT Pub. No.: WO2020/053182
PCT Pub. Date: Mar. 19, 2020

(65) Prior Publication Data
US 2022/0053282 A1    Feb. 17, 2022

(30) Foreign Application Priority Data

Sep. 13, 2018    (EP) .................................. 18194293

(51) Int. Cl.
*H04S 7/00*    (2006.01)
*G06T 15/04*    (2011.01)

(52) U.S. Cl.
CPC .............. *H04S 7/303* (2013.01); *G06T 15/04* (2013.01); *H04S 2400/11* (2013.01); *H04S 2420/01* (2013.01)

(58) Field of Classification Search
CPC ........ G06V 10/00; H04N 13/00; H04N 19/33; H04N 13/275; G02B 27/017; G06T 19/006; G06T 19/20; G06T 19/003
(Continued)

(56) References Cited

U.S. PATENT DOCUMENTS

2014/0279242 A1*  9/2014  Staicut ............... G06Q 30/0623
                                                         705/26.61
2015/0302551 A1   10/2015  Chao et al.
(Continued)

FOREIGN PATENT DOCUMENTS

EP    3264228 A1    1/2018

OTHER PUBLICATIONS

International Search Report and Written Opinion from PCT/EP2019/074046.
(Continued)

*Primary Examiner* — Alexander Krzystan

(57) ABSTRACT

An apparatus for processing audiovisual data for a scene comprises a receiver (201) for receiving audiovisual data for the scene. The audiovisual data comprises audio data for the scene comprising a plurality of audio elements and image data for at least a first image of the scene where the first image has a first aspect ratio. An image remapper (203) performs a content dependent non-uniform mapping of the first image to a second image which has a different aspect ratio. The image remapper (207) is arranged to generate mapping data describing the content dependent non-uniform mapping. An audio remapper (207) replaces a first audio element of the plurality of audio elements by a second audio element generated by modifying a spatial property for the first audio element in response to the mapping data. The spatial property being modified may be a position and/or spatial spread of the first audio element.

28 Claims, 4 Drawing Sheets

(58) Field of Classification Search
USPC ..................................... 381/310, 22; 700/94
See application file for complete search history.

(56) References Cited

U.S. PATENT DOCUMENTS

2018/0192222 A1    7/2018  De Bruijn
2019/0340821 A1*  11/2019  Chen .................. G06F 3/04815

OTHER PUBLICATIONS

Iso et al: "International Organisation for Standardisation Organisation Internationale De Normalisation ISO/IEC JTC1/SC29/WG11 Coding of Moving Pictures and Audio Source Requirements Status Approved Title Use cases and draft requirements for Network Based Media Processing (vl) Authors", Jul. 3'1, 2017 (Jul. 31, 2017), XP055554936.
M41396, "Proposed list of functions for network based media processing", input contribution to 120th MPEG meeting, Macau (China), Oct. 2017.

* cited by examiner

APPARATUS AND METHOD FOR PROCESSING AUDIOVISUAL DATA

CROSS-REFERENCE TO PRIOR APPLICATIONS

This application is the U.S. National Phase application under 35 U.S.C. § 371 of International Application No. PCT/EP2019/074046, filed on Sep. 10, 2019, which claims the benefit of EP Patent Application No. EP 18194293.9, filed on Sep. 13, 2018. These applications are hereby incorporated by reference herein.

FIELD OF THE INVENTION

The invention relates to an apparatus and method for processing audiovisual data and in particular, but not exclusively, to processing of audiovisual data for e.g. providing a virtual reality experience.

BACKGROUND OF THE INVENTION

The variety and range of experiences based on audiovisual content have increased substantially in recent years with new services and ways of utilizing and consuming such content being continuously developed and introduced. In particular, many spatial and interactive services, applications and experiences are being developed to give users a more involved and immersive experience.

Examples of such applications are Virtual Reality (VR) and Augmented Reality (AR) applications, which are rapidly becoming mainstream, with a number of solutions being aimed at the consumer market. A number of standards are also under development by a number standardization bodies. Such standardization activities are actively developing standards for the various aspects of VR/AR systems including e.g. streaming, broadcasting, rendering, etc.

VR applications tend to provide user experiences corresponding to the user being in a different world/environment/scene whereas AR applications tend to provide user experiences corresponding to the user being in the current environment but with additional information or virtual objects or information being added. Thus, VR applications tend to provide a fully inclusive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

Video content, such as that e.g. used for virtual reality applications), is increasingly being captured with a wide range of different types of devices, ranging from professional camera systems to smartphones, tablets, action cams, (360-degree) camera add-ons for smart phones, etc. Moreover, all this video content is being consumed on an equally wide range of display devices, e.g. smart phones, TV's, tablets, Head Mounted Displays (HMD's) for VR, etc.

All these devices have specific properties regarding the native and/or supported aspect ratios of the video content. For capturing devices, this is mainly defined by the size and shape of the video sensor chip, while for displaying devices it is the size and shape of the display that determine the optimal aspect ratio of video content to be displayed on the device.

The result is that often the aspect ratios of the video content and of the device on which the content is displayed do not match, especially with more and more User Generated Content (UGC) being captured by consumers on a myriad of devices.

To prevent that a large part of the display is not used or, conversely, that part of the video image is "cut off", a conversion of the aspect ratio ("upscaling") may be applied to the video image. However, when done in the most straightforward way by means of linear stretching or compressing of one (or more) dimensions, this often results in an undesirable distortion of the image.

To overcome this problem of image distortion, more advanced "intelligent" video upscaling algorithms have been developed in recent years, which apply a non-uniform remapping to the image that takes into account the characteristics of different parts of the video image, e.g. making a distinction between foreground- and background, between "central" and "peripheral" parts, and/or between "objects" and "texture". Such distinctions can be made on the basis of pure visual parameters like e.g. local contrast, but also on the basis of more advanced analysis algorithms based on Artificial Intelligence (AI)/machine learning, e.g. recognizing objects as "person" or "car".

The image analysis that is required to perform this "intelligent" video upscaling is computationally intensive, and for AI based analysis it also requires a rather large learning database.

For this reason, the AI-based algorithm is preferably not performed directly on the end-user device, but on a (remote) distributed computer network. This network may be "the cloud", or some defined computer network. This also has the advantage that the AI algorithm can benefit from the feedback of many users to, over time, improve the subjective quality of the intelligent upscaling.

MPEG has recently initiated a new standardization activity on "Network-based Media Processing" ("NBMP") that has an aim of enabling distributed analysis and processing of media content, such as the intelligent upscaling described above. This activity is part of the new MPEG-I standard for Immersive Media (VR, AR, MR).

However, whereas such intelligent aspect ratio adaptation may often provide an improved user experience by adapting the presented video to the specific aspect ratio, the approach may in itself not provide an optimal user experience.

Hence, an improved approach for processing audiovisual data for a scene would be advantageous. In particular, an approach that allows improved operation, increased flexibility, reduced complexity, facilitated implementation, an improved user experience, a more consistent perception of a scene, an improved virtual reality experience, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided apparatus for processing audiovisual data for a scene, the apparatus comprising: a receiver for receiving audiovisual data for the scene, the audiovisual data comprising audio data for the scene comprising a plurality of audio elements and image data for at least a first image of the scene, the first image having a first aspect ratio; an image remapper for performing a content dependent non-uniform mapping of the first image to a second image having a second aspect ratio, the second aspect ratio being different from the first aspect ratio and the image remapper being arranged to generate mapping data describing the content dependent non-uniform mapping; and an audio remapper arranged to replace a first audio element of the plurality of audio elements by a second audio element generated by modifying a spatial property for the first audio element in response to the mapping data.

This may provide an improved user experience in many embodiments and may in many scenarios provide an improved and more consistent perception of audio and video which may typically lead to a more realistic and immersive experience. It may further provide a practical and low complexity implementation.

An improved and more natural perception of the scene may typically be achieved and in many scenarios interference and inconsistency resulting from the audio and visual scene representation may be mitigated or reduced. The approach may be particularly advantageous for Virtual Reality, VR, (including Augmented Reality, AR) applications.

The approach may in many embodiments provide improved performance while maintaining low complexity and resource usage.

The Inventors have realized that whereas content adaptive aspect ratio adaption may lead to an improved adaptation of rendered video to the specific rendering display means, it may also in some situations result in a degraded overall user experience due to the adaptation resulting in potential discrepancy between spatial perceptions of the audio and video. The Inventors have furthermore realized that an approach of a predetermined adaptation of the audio to match the specific display means and aspect ratio will tend to result in suboptimal results. The Inventors have realized that improved overall user perception, and specifically a more consistent approach, can be achieved by applying a remapping to the audio where an image remapper generates mapping data describing the specific remapping performed and the audio remapping is adapted based on this mapping data.

The content dependent non-uniform mapping may be a non-linear mapping which is adapted in response to content of the first image. The mapping data may be indicative of how different image segments have shifted from the first image to the second image. The shift may e.g. be an absolute shift or may be a relative shift between different image segments/positions/pixels. The content dependent non-uniform mapping may be a two-dimensional mapping of positions of the first image to positions in the second image (for at least some positions). The two-dimensional mapping may be in the display plane, and the positions may be display plane positions. The content dependent non-uniform mapping may be an image aspect ratio changing content dependent non-uniform mapping.

The mapping data may describe the content dependent non-uniform mapping by describing a relation between positions in the first image and positions in the second image (for at least some positions). The positions in the first image and/or the second image may be two-dimensional positions in the display plane. The positions in the first image and/or the second image may be absolute and/or relative positions.

The second audio element may represent the same audio content as the first audio element but with a different spatial property, such as a different position and/or spatial spread property.

In many embodiments, the apparatus may comprise functionality for rendering of the scene based on the audio data and visual data (after modification by the image remapper and the audio remapper). However, in other embodiments, such rendering may be external to the apparatus.

An aspect ratio may be the ratio of the width to the height of an image or screen.

In accordance with an optional feature of the invention, the audio remapper is arranged to generate the second audio element by modifying a spatial position property of the first audio element in response to the mapping data.

This may provide a particularly advantageous performance and/or user experience in many embodiments. It may typically provide improved consistency between the audio and visual representation of the scene.

In accordance with an optional feature of the invention, the audio remapper is arranged to generate the second audio element by changing a spatial position for the first audio element from a position corresponding to an image position in the first aspect ratio to an image position in the second image.

This may provide a particularly advantageous performance and/or user experience in many embodiments.

In accordance with an optional feature of the invention, the audio remapper is arranged to generate the second audio element by modifying a spatial spread property of the first audio element in response to the mapping data.

This may provide an improved user experience in many embodiments and may particularly provide additional flexibility in adapting the sound stage to provide an experience compatible with the provided visual output. The spatial spread property may be indicative of a degree of physical or perceived size, indicating how much area an audiovisual object covers of the user's view, display and/or range of directions of arrival of incoming sound pressure waves. An indication of how much bigger the sound element is, or should be rendered, than a point-source, its diffuseness. A suitable measure for the spatial spread may in different embodiments be e.g. absolute dimension(s), angle(s), radius/radii.

In accordance with an optional feature of the invention, the audio remapper is further arranged to generate the second audio element by modifying the spatial property in response to an audio property of the first audio element.

This may provide an improved performance and/or user experience. The audio property may be an acoustic property.

In accordance with an optional feature of the invention, the acoustic property comprises a degree of spatial spread for the first audio element.

This may allow a more accurate adaptation of the determination of the modified spatial property.

In accordance with an optional feature of the invention, the audio remapper is arranged to reduce a position change between the second audio element and the first audio element for an increasing degree of spatial spread for the first audio element.

This may provide improved performance and/or an improved user experience in many embodiments.

In accordance with an optional feature of the invention, the audio remapper is arranged to select whether to apply the modification to the spatial property or not dependent on the degree of spatial spread.

This may provide improved performance and/or an improved user experience in many embodiments. In some embodiments, the audio remapper may be arranged to select whether to replace the first audio element by the second element or not dependent on the degree of spatial spread.

In accordance with an optional feature of the invention, the audio remapper is arranged to modify the spatial property in response to an audio type of the first audio element.

This may provide improved performance and/or an improved user experience in many embodiments. Audio types may include one or more from the group of an audio channel, a higher order ambisonics audio element, and an audio object.

In accordance with an optional feature of the invention, the audio remapper is arranged to modify the spatial property in response to whether the first audio element is linked to an image object in the first image.

This may provide improved performance and/or an improved user experience in many embodiments.

In accordance with an optional feature of the invention, the audio remapper is arranged to modify the spatial property dependent on whether the first audio element is designated as background audio.

This may provide improved performance and/or an improved user experience in many embodiments.

In some embodiments, the audio remapper may be arranged to apply a non-uniform spatial widening to audio elements of the plurality of audio elements being audio channels.

In accordance with an optional feature of the invention, the audio remapper is arranged to modify the spatial property in response to a property of a display for rendering the second image.

This may provide improved performance and/or an improved user experience in many embodiments. The property of the display may specifically be a size of the display.

In accordance with an optional feature of the invention, the audio remapper is arranged to modify the spatial property in response to a viewer position relative to a display for rendering the second image.

This may provide improved performance and/or an improved user experience in many embodiments. The viewer position may be a nominal or assumed viewer position, or may e.g. be a measured and identified viewer position.

According to an aspect of the invention there is provided a method of processing audiovisual data for a scene, the method comprising: receiving audiovisual data for the scene, the audiovisual data comprising audio data for the scene comprising a plurality of audio elements and image data for at least a first image of the scene, the first image having a first aspect ratio; performing a content dependent non-uniform mapping of the first image to a second image having a second aspect ratio, the second aspect ratio being different from the first aspect ratio and the content dependent non-uniform mapping comprising generating mapping data describing the content dependent non-uniform mapping; and replacing a first audio element of the plurality of audio elements by a second audio element generated by modifying a spatial property for the first audio element in response to the mapping data.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
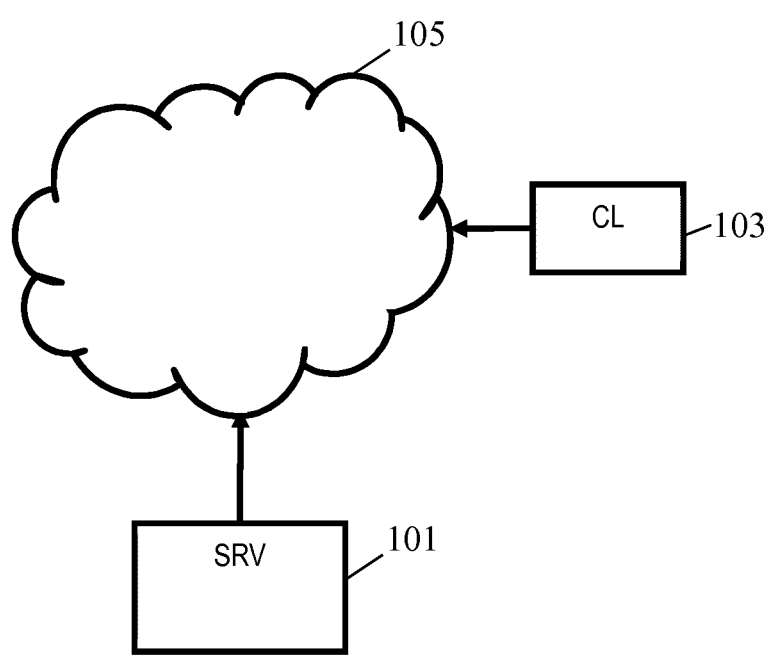
FIG. 1 illustrates an example of client server arrangement for providing a virtual reality experience.

The following description focuses on embodiments of the invention applicable to a virtual reality system. However, it will be appreciated that the invention is not limited to this application but may be applied to many other systems for distribution, processing and/or rendering of audiovisual data.

The description will further focus on the handling and processing of audiovisual data in the context of client server approaches supported by a network which specifically may be a public network, such as the Internet. However, it will again be appreciated that this is merely an exemplary application of the described principles and approaches and that these may be used in many other systems and applications. including for example systems in which audiovisual data is provided in the form of a dedicated data stream transmitted directly to a processing/rendering device or embodiments where the rendering device itself retrieves or generates the audiovisual data.

Virtual (including augmented) experiences allowing a user to move around in a virtual or augmented world are becoming increasingly popular and services are being developed to satisfy such demands. In many such approaches, visual and audio data may dynamically be generated to reflect a user's (or viewer's) current pose.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be represented by fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Typically, the virtual reality application generates a three-dimensional output in the form of separate view images for the left and the right eyes. These may then be presented to the user by suitable means, such as typically individual left and right eye displays of a VR headset. In other embodiments, one or more view images may e.g. be presented on an autostereoscopic display, or indeed in some embodiments only a single two-dimensional image may be generated (e.g. using a conventional two-dimensional display).

Similarly, for a given viewer/user/listener pose, an audio representation of the scene may be provided. The audio scene is typically rendered to provide a spatial experience where audio sources are perceived to originate from desired positions. As audio sources may be static in the scene, changes in the user pose will result in a change in the relative position of the audio source with respect to the user's pose. Accordingly, the spatial perception of the audio source should change to reflect the new position relative to the user. The audio rendering may accordingly be adapted depending on the user pose.

In many embodiments, the audio rendering is a binaural rendering using Head Related Transfer Functions (HRTFs) or Binaural Room Impulse Responses (BRIRs) (or similar) to provide the desired spatial effect for a user wearing a headphone. However, it will be appreciated that in some systems, the audio may instead be rendered using a loudspeaker system and the signals for each loudspeaker may be rendered such that the overall effect at the user corresponds to the desired spatial experience.

The viewer or user pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position of the VR headset. In some systems, the viewer pose may be provided by manual means, e.g. by the user manually controlling a joystick or similar manual input. For example, the user may manually move the virtual viewer around in the virtual scene by controlling a first analog joystick with one hand and manually controlling the direction in which the virtual viewer is looking by manually moving a second analog joystick with the other hand.

In some systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene. The view images are then transmitted to the device local to the viewer where they are presented. For example, the remote device may directly generate a video stream (typically a stereo/3D video stream) which is directly presented by the local device. Similarly, the remote device may generate an audio scene reflecting the virtual audio environment. This may in many embodiments be done by generating audio signals that correspond to the relative position of different audio sources in the virtual audio environment, e.g. by applying binaural processing to the individual audio components corresponding to the current position of these relative to the head pose. Thus, in such an example, the local device may not perform any VR processing except for transmitting movement data and presenting received video and audio data.

In many systems, the functionality may be distributed across a local device and remote device. For example, the local device may process received input and sensor data to generate viewer poses that are continuously transmitted to the remote VR device. The remote VR device may then generate the corresponding view images and transmit these to the local device for presentation. In other systems, the remote VR device may not directly generate the view images but may select relevant scene data and transmit this to the local device which may then generate the view images that are presented. For example, the remote VR device may identify the closest capture point and extract the corresponding scene data (e.g. spherical image and depth data from the capture point) and transmit this to the local device. The local device may then process the received scene data to generate the images for the specific, current view pose.

Similarly, the remote VR device may generate audio data representing an audio scene by a number of audio elements, which may be different audio components, audio objects, audio signals, audio channel signals etc corresponding to different audio sources in the audio scene. For some or all of these audio elements, the audiovisual data may in some embodiments further comprise position information indicative of the position of the audio sources (which may e.g. dynamically change for moving objects) as well as potentially other spatial data or acoustic metadata (e.g. how diffuse or reverberant a given audio source is). The local VR device may then render such signals appropriately, e.g. by applying appropriate binaural processing reflecting the relative position of the audio sources for the audio components.

FIG. 1 illustrates such an example of a VR system in which a remote server 101 liaises with a client device 103 e.g. via a network 105, such as the Internet. The remote server 101 may be arranged to simultaneously support a potentially large number of client devices 103.

Such an approach may in many scenarios provide an improved trade-off e.g. between complexity and resource demands for different devices, communication requirements etc. For example, the viewer pose and corresponding scene data may be transmitted with larger intervals with the local device processing the viewer pose and received scene data locally to provide a real time low lag experience. This may for example substantially reduce the required communication bandwidth while providing a low lag experience and while allowing the scene data to be centrally stored, generated, and maintained. It may for example be suitable for applications where a VR experience is provided to a plurality of remote devices.

In some embodiments, the server 101 may generate a continuous audiovisual data stream comprising a real time video stream and associated real time audio stream corresponding to the viewers current pose (as determined from data received from the client 103). This real time audiovisual stream may be generated such that it can be rendered directly by the client 103 and specifically no pose or viewpoint shift processing or virtual reality environment processing may in some embodiments be performed or required at the client 103. This may be suitable for many low processing resource devices, such as e.g. many mobile devices or low resource headset devices. The required processing at the client may be reduced to a minimum.

Such an approach may also be particularly suitable for scenarios in which the experience is a shared experience where a plurality of people are interested in having the same perception of a scene. Such a scenario is typical in broadcasting, including for example 3D broadcasting from a sports event. This approach is not limited to traditional audiovisual broadcasts but may also be used in systems where the view pose is dynamically determined and varying. The shared experience may also be applicable to some VR experiences and services.

For example, for an esports broadcast, the player may control the movement in a virtual reality environment with the resulting audiovisual data for the specific poses also being distributed by the server 101 to a large number of passive clients 103. A user at the individual passive client may in such an embodiment essentially see the esports event through the eyes of the player.

E.g. for an esports event where the players are playing a first person shooter game, the individual player is controlling his avatar and moving around in a scene in which the battle takes place. Other players will be able to see the avatar but the player himself does not see his own avatar (or at least not all of it) but instead sees the view of the scene that his avatar would experience (i.e. that a person in the virtual scene would see from that viewpoint). Esports have recently become a very popular sport with very large events attracting tens of thousands of viewers that can directly watch the game on large displays at the venue where the game is being played. The displays may for example present an overview of the scene with an indication of the position of the individual players and with the views of the individual players.

In addition, such esport events may also often be streamed to spectators who are not at the venue and often they may be streamed to a very large number of viewers, which in some cases could be hundreds of thousands or even millions of viewers watching in real time. In such cases, the view that is generated for one of the players dependent on the input and control of that player may result in view images (video sequence) that are not only presented to the player but are also be live streamed to a very large number of separate viewers in different locations and circumstances, and using different equipment for viewing. An issue with proving content to multiple, and especially to large numbers of clients, is that the characteristics of the clients, and specifically the means for rendering, may vary substantially for different devices and may not be known at the server. Accordingly, in many approaches, the server 101 will generate the audiovisual data stream for a given nominal or standardized device. Specifically, the data stream may be generated for a given nominal rendering display. Such considerations may include the resolution, color depth, aspect ratio, size, etc. If the local rendering means do not match the assumed characteristics, an adaptation may be performed locally at the device 103.

In particular, the adaptation of the aspect ratio to match the specific display used at the individual client may have significant impact on the user experience as it very directly affects the visual presentation. For example, using the wrong aspect ratio may result in black bars around the image and many low complexity aspect ratio adaptations result in significant geometric distortions.

Figure 2:
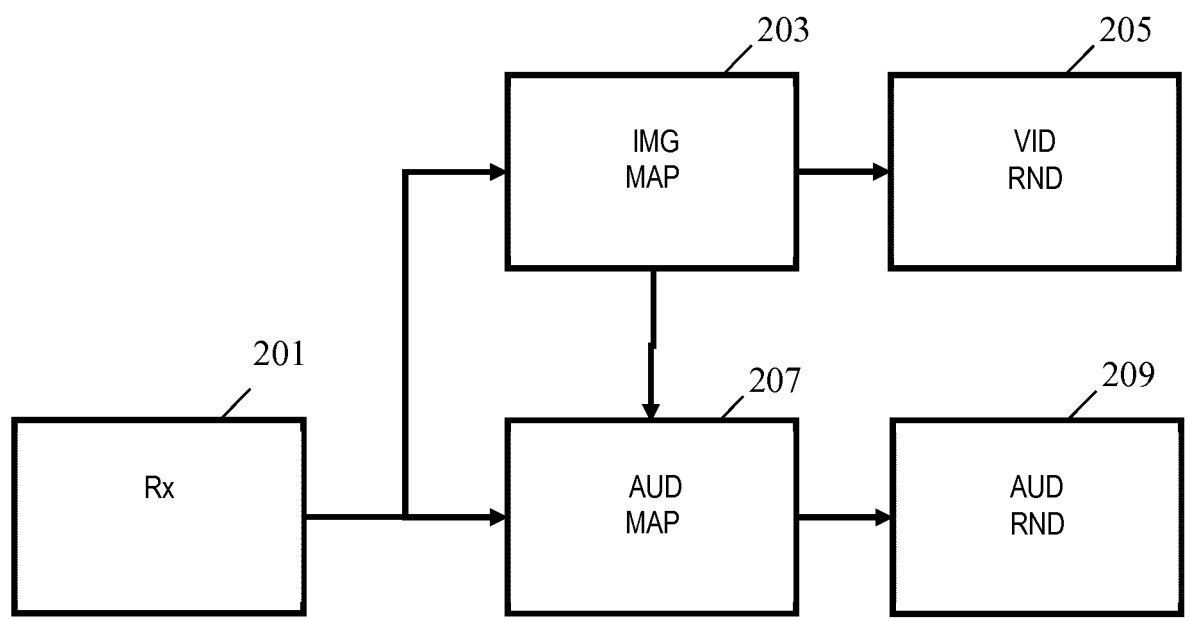
FIG. 2 illustrates an example of elements of an audio apparatus in accordance with some embodiments of the invention.

FIG. 2 illustrates an example of a client device 103 which is arranged to adapt a received audiovisual data stream to match the specific aspect ratio of a display on which the visual data is to be presented.

The client device 103 comprises a receiver 201 which is arranged to receive audiovisual data for a scene with the audiovisual data comprising data describing both visual and audio aspects of the scene. The audiovisual data specifically comprises image data for at least a first image of the scene, and specifically in the described embodiments comprises a video stream providing images in the form frames of a video sequence. The first image has a given aspect ratio (i.e. a given ratio between the width and height of the image). In many embodiments, a 3D video stream may be provided comprising frames for both the left and right eye images corresponding to a specific view pose for the scene.

In addition, the audiovisual data comprises audio data for the scene where the audio data describes a number of audio elements for the scene. For example, audio data comprising different audio elements in the form of audio channels, audio objects, audio channel, Higher Order Ambisonics, etc. In some embodiments, the audio elements of the audio data may all be the same type but in many embodiments the audio scene may represent the audio scene by the audio data comprising different types of audio elements for different audio sources.

Thus, in many embodiments, the received audio data describes an audio scene corresponding to the scene visually represented by the video data by a number of different audio elements, which may be different types of audio elements.

For example, some audio elements may correspond to a single audio source having a specific and well defined spatial position in the scene (i.e. potentially a virtual spatial position in a virtual scene). Such an audio source may for example be represented by a specific and individual audio object with associated position data. For example, an audio object may be provided for each instrument in an orchestra and/or for each person in a given scene. Other audio elements may correspond to a combination of different audio sources and these may typically have less well-defined spatial positions. For example, a background audio ambient signal may be provided that represents the general background or ambient sound in the scene. Such an audio signal may be more diffuse and spread out than an audio object, which directly represents a single audio source.

The receiver 201 is coupled to an image remapper 203 which is fed the image data, i.e. it receives image data for at least one image but typically for a large number of frames of a video sequence. The image remapper 203 is arranged to perform a content dependent non-uniform mapping of the first image to a second image having a different aspect ratio (a second aspect ratio) than the original aspect ratio. For example, the received audiovisual data may comprise pictures or frames in a given aspect ratio such as for example the ubiquitous 16:9 aspect ratio. However, the apparatus of FIG. 2 may be arranged to drive a display that has a different aspect ratio. For example, the display may be a 4:3 aspect ratio, a 21:9 aspect ratio, or an 18:9 aspect ratio (which is often used for VR headsets). The image remapper 203 is arranged to generate a modified image which has a different aspect ratio. For example, a first image received in the received audiovisual data may be modified to provide a second image that has a different aspect ratio. The aspect rate conversion is not merely a standard predetermined stretch/compression of the image from the input aspect ratio to the display ratio but rather is a non-uniform and content dependent mapping from one aspect ratio to another. In the mapping, some parts of the image are stretched/repositioned according to a different function than other parts. The image remapper 203 does not merely apply a predetermined mapping but adapts the applied mapping dependent on the content in the images.

For example, in many embodiments, the image remapper 203 may be arranged to divide the image into segments and may apply different mappings to at least two different segments of the image. E.g. the image remapper 203 may divide the segments into a number of categories or types and may apply a specific remapping algorithm to each type of segment. The resulting remapped segments may then be combined into the second image, e.g. by selecting the foreground segment for areas of the segments that following the remapping are overlapping and infilling holes occurring from the mapping (e.g. from a background segment).

As a specific low complexity example, the image remapper 203 may perform segmentation of a received image. The segmentation may be based on image content (e.g. colors, brightness etc.) as well as possibly based on a depth map associated with a received image, as will be well known to the skilled person. Based on the segmentation, the segments may be divided into a group comprising the segments that correspond to respectively salient objects (e.g. foreground objects, objects corresponding to people, detected faces etc.) and to non-salient objects (including e.g. background). An intermediate image may be formed by all non-salient objects/segments and a predetermined aspect rate mapping (e.g. a predetermined stretch) may be applied to this image. For example, a simple predetermined uniform stretch or a predetermined anamorphic stretch may be applied to generate a second intermediate image having an aspect ratio corresponding to the display. The holes in the image may then be filled, e.g. by infilling using extrapolation from neighboring areas as known in the art, or by stretching the background image in between.

New positions may be determined for the salient objects and these will typically be determined to have less distortion compared to the original image than for the predetermined mapping of the non-salient image. For example, the salient objects/images may all be determined to have positions that do not change relative to each other, i.e. the distances between the salient objects may be maintained to remain the same. The absolute position may e.g. be determined to have the same offset from the center of the image. Finally, the salient objects may be overlaid on the second intermediate image to generate an output image corresponding to the original image but with the desired aspect ratio, such as typically that of the display on which the image/video is to be rendered.

Such an example may e.g. result in salient objects remaining in the same position relative to each other and the center of the image but with the background being stretched to match the new aspect ratio. For example, for two people standing on a beach, the generated image may have the two people standing at the same position in the displayed image and with the same proximity to each other but with the background beach and sea being stretched such that it fills the entire image.

It will be appreciated that this is merely a low complexity example and that many different, and often more complex, algorithms may be used instead. Examples can e.g. be found in ""Use cases and draft requirements for Network Based Media Processing (v1)", output document of 119th MPEG meeting, Torino (Italy), July 2017.

The image remapper 203 is coupled to a video renderer 205 which receives the remapped images/frames from the image remapper 203 and generates a suitable drive signal for a display (not shown) on which the images/frames are displayed. It will be appreciated that the exact function of the video renderer depends on the properties/characteristics of the specific display and the specific image properties. For example, the video renderer 205 may be arranged to generate an output signal in accordance with a specific video/display driver standard.

For example, the image remapper 203 may in some embodiments operate on non-encoded data, i.e. the images may be represented by unencoded pixel values (e.g. direct RGB pixel values) and the output of the image remapper 203 may accordingly be unencoded pixel values. The apparatus may be arranged to drive a monitor using a display standard that includes video compression (e.g. VESA Display Stream Compression) and the video renderer may be arranged to compress the data from the image remapper 203 to generate a compressed video stream in accordance with the specific standard.

As another example, if the device is a driving a dedicated and proprietary VR headset and the images provided by the image remapper 203 are encoded, the video renderer 205 may decode the video images to render e.g. RGB values for each pixel and these may be converted into suitable drive signals for each pixel of the display of the VR headset. The drive signals may then be fed to an external display panel driver for directly driving the display(s) of the headset.

As another example, the video renderer 205 may be arranged to generate a data stream that is suitable for a display by adding and structuring the image data from the image remapper 203. For example, in order to communicate with a display using e.g. HDMI or DisplayPort interfaces, the video renderer 205 may add a clock, error correction, control data etc. to generate a bitstream matching the specific standard.

The video renderer 205 may thus perform the required conversion, processing and translation required between the image data of the images from the image remapper 203 and the signal/data stream required by a subsequent display.

The apparatus of FIG. 2 may accordingly adapt the received visual data to the specific display used and provide an improved image and visual experience. However, the Inventors have further realized that an issue with such a flexible and content based aspect ratio mapping is that it may degrade the audio side of the user experience. The Inventors have realized that the image remapping may result in an increased perceptual experience of the audio being inaccurate or artificial and the overall experience may be perceived to be less natural. In order to address e.g. such issues, the apparatus of FIG. 2 comprises functionality for modifying the audio side prior to rendering.

The apparatus comprises an audio remapper 207 which receives the audio data from the receiver 201. The audio remapper 207 accordingly receives audio data describing a number of audio elements of the audio scene. The audio remapper 207 is arranged to modify a spatial property of one or more of the received audio elements. Specifically, the audio remapper 207 may replace a first audio element in the audio scene/audio data by a second audio element which has a modified spatial property, such as for example a different position or a different spread/position.

The audio remapper 207 is coupled to an audio renderer 209 which receives the audio data including the modified audio element(s) (i.e. the second audio element is received rather than the first audio element as this has been replaced). The audio renderer 209 is arranged to render the received audio data using any suitable rendering approach. The audio renderer 209 may generate audio signals for e.g. spatial audio rendering using loudspeakers or e.g. using headphones (binaural rendering).

It will be appreciated that many algorithms and approaches for rendering of spatial audio using loudspeakers, and specifically in surround sound systems, will be known to the skilled person and that any suitable approach may be used without detracting from the invention.

For example, the audio renderer 209 may generate audio signals for five loudspeakers in a surround sound configuration with a center speaker, left front speaker, right front speaker, left surround speaker, and right surround speaker. The audio renderer 209 may generate a set of audio signals comprising an audio signal for each loudspeaker. The signals may then be amplified to generate drive signals for the individual loudspeaker.

In some embodiments, an audio element which is being rendered using the loudspeakers may be received as e.g. a stereo downmix and the audio renderer 209 may perform an upmixing to generate the surround signals which in some cases may be rendered directly. Such an approach may for example be useful for audio elements representing diffuse sound that is not directly related to the user pose. For example, an audio element representing generic diffuse ambient audio may be provided as a stereo downmix which can directly be upmixed to provide the appropriate surround sound audio channels. Each of the resulting upmixed signals may be combined with signals for the corresponding speakers generated from other audio elements to generate the set of output signals.

Some audio elements that are rendered via the loudspeaker setup may for example be provided in the form of audio objects. Such an audio object may be represented by audio data describing the specific audio and associated position data which describes the position of the audio source. Based on the position data and the positions of the loudspeakers (whether actual positions or nominal positions for the surround sound speaker setup), the audio renderer 209 may determine coefficients for a matrix or vector mapping the audio signal to the different surround sound channels.

In many embodiments, the audio rendering by the audio renderer 209 is a binaural render process using suitable binaural transfer functions to provide the desired spatial effect for a user wearing a headphone. For example, the audio renderer 209 may be arranged to generate an audio component to be perceived to arrive from a specific position using binaural processing.

Binaural processing is known to be used to provide a spatial experience by virtual positioning of sound sources using individual signals for the listener's ears. With an appropriate binaural rendering processing, the signals required at the eardrums in order for the listener to perceive sound from any desired direction can be calculated, and the signals can be rendered such that they provide the desired effect. These signals are then recreated at the eardrum using either headphones or a crosstalk cancelation method (suitable for rendering over closely spaced speakers). Binaural rendering can be considered to be an approach for generating signals for the ears of a listener resulting in tricking the human auditory system into thinking that a sound is coming from the desired positions.

The binaural rendering is based on binaural transfer functions that vary from person to person due to the acoustic properties of the head, ears and reflective surfaces, such as the shoulders. For example, binaural filters can be used to create a binaural recording simulating multiple sources at various locations. This can be realized by convolving each sound source signal with the pair of e.g. Head Related Impulse Responses (HRIRs) that correspond to the position of the sound source.

A well-known method to determine binaural transfer functions is binaural recording. It is a method of recording sound that uses a dedicated microphone arrangement and is intended for replay using headphones. The recording is made by either placing microphones in the ear canal of a subject or using a dummy head with built-in microphones, a bust that includes pinnae (outer ears). The use of such dummy head including pinnae provides a very similar spatial impression as if the person listening to the recordings was present during the recording.

By measuring e.g. the responses from a sound source at a specific location in 2D or 3D space to microphones placed in or near the human ears, the appropriate binaural filters can be determined. Based on such measurements, binaural filters reflecting the acoustic transfer functions to the user's ears can be generated. The binaural filters can be used to create a binaural recording simulating multiple sources at various locations. This can be realized e.g. by convolving each sound source with the pair of measured impulse responses for a desired position of the sound source. In order to create the illusion that a sound source is moved around the listener, a large number of binaural filters is typically required with adequate spatial resolution, e.g. 10 degrees.

The head related binaural transfer functions may be represented e.g. as Head Related Impulse Responses (HRIR), or equivalently as Head Related Transfer Functions (HRTFs) or, Binaural Room Impulse Responses (BRIRs), or Binaural Room Transfer Functions (BRTFs). The (e.g. estimated or assumed) transfer function from a given position to the listener's ears (or eardrums) may for example be given in the frequency domain in which case it is typically referred to as an HRTF or BRTF, or in the time domain in which case it is typically referred to as a HRIR or BRIR. In some scenarios, the head related binaural transfer functions are determined to include aspects or properties of the acoustic environment and specifically of the room in which the measurements are made, whereas in other examples only the user characteristics are considered. Examples of the first type of functions are the BRIRs and BRTFs.

The audio renderer 209 may accordingly comprise a store with binaural transfer functions for a, typically high, number of different positions with each binaural transfer function providing information of how an audio signal should be processed/filtered in order to be perceived to originate from that position. Individually applying binaural processing to a plurality of audio signals/sources and combining the result may be used to generate an audio scene with a number of audio sources positioned at appropriate positions in the sound stage.

The audio renderer 209 may for a given audio element that is to be perceived to originate from a given position relative to the user's head, select and retrieve the stored binaural transfer function that most closely matches the desired position (or in some case may generate this by interpolating between a plurality of close binaural transfer functions). It may then apply the selected binaural transfer function to the audio signal of the audio element thereby generating an audio signal for the left ear and an audio signal for the right ear.

The generated output stereo signal in the form of the left and right ear signal is then suitable for headphone rendering and may be amplified to generate drive signals that are fed to the headset of a user. The user will then perceive the audio element to originate from the desired position.

In the apparatus of FIG. 2, the image remapper 203 is arranged to generate mapping data that describes at least part of the image remapping that has been performed by the image remapper 203 in order to change the aspect ratio. For example, the image remapper 203 may provide information which indicates the modified or new positions of specific image objects in the second image and/or may for example include data indicating the mapping that has been used for the background image, or for a certain segment of the image.

The mapping data may be any data describing a property of the mapping from the first image to the second image performed by the content dependent non-uniform mapping. The mapping data may specifically include data describing a relationship between positions in the first image and positions in the second image for at least some positions. The mapping data may for example describe how image positions in the first image are mapped to image positions in the second image by the content dependent non-uniform mapping. The positions may be two dimensional positions an may be absolute and/or relative positions, typically with respect to a coordinate system for the corresponding first or second image.

The mapping data is provided from the image remapper 203 to the audio remapper 207 and the audio remapper 207 is arranged to modify the spatial property of the audio element(s) depending on/in response to/as a function of/based on the mapping data (and thus based on the image aspect ratio content dependent non-uniform mapping). For example, a position mapping may be applied to the first audio element to generate the second audio element and the position mapping may be adapted based on the received mapping data.

For example, the mapping data may describe a relationship between positions in the first image and in the second image, and the audio remapper 207 may be arranged to modify positions of the audio elements based on the change in positions between the first image and the second image as described by the mapping data.

As a specific example, if the mapping data indicates that the position of an image object corresponding to a given object in the scene is moved to a different position in the image, the audio remapper 207 may be arranged to modify the spatial position of the audio element representing the sound generated by that object such that it matches the new position. For example, in some embodiments, an audio element may comprise associated position metadata which is used by the audio renderer 209 to render the audio element such that it is perceived to originate from the determined position. In such embodiments, the audio remapper 207 may directly change the position metadata before being fed to the audio renderer 209. Specifically, the audio remapper 207 may retrieve the position for the audio element and then offset it by an amount which corresponds to the shift of the corresponding image object in the changed aspect ratio. The modified position may then be fed to the audio renderer 209 and used by this when rendering the audio element. Accordingly, the audio element will be rendered to appear to originate from the modified position. Such an approach may typically be particularly suitable for audio objects which often are provided with explicit position data.

In other embodiments, the exact position may not be known but can be derived from the received audio data. For example, if the audio element is represented by, say, five surround sound channels (or a downmix thereof), the relative signal level and timing in each of the audio channels will indicate the spatial position of the corresponding audio source. This position may then be estimated, modified, and the audio channels signals may be compensated to reflect the new position. In many embodiments, the modification of the spatial position may be performed directly by processing the audio signals and without any explicit derivation of the original position. For example, if a surround channel audio element is received that is linked to an image object which is indicated by the mapping data to have been shifted e.g. 10° to the left, the audio remapper 207 may apply a matrix operation to the audio channel signals that rotates these 10° in the correct direction.

Indeed, in the case of audio content that is defined in a channel-based format, the spatial distribution of audio sources in the audiovisual scene is typically defined implicitly by relative level- and time relationships between the channels, e.g. due to panning algorithms used in the generation of the channel-based audio elements. Also, sound from multiple sources may be mixed together in the channels, so the signals of the individual sources may not be readily available separately as in the case of audio objects.

In the channel-based case, the remapping of the audio elements may for example be achieved using a spatial widening algorithm, of which a wide variety exists. However, contrary to how such spatial widening algorithms are commonly used (i.e. stretching or compressing the spatial audio scene uniformly along the spatial dimension), the spatial widening algorithm may be applied in a non-uniform way corresponding to the non-uniform remapping of the video image.

Channel level differences between channels may be calculated in time-frequency tiles and used to match such time-frequency tiles to visual objects or image segments represented in the mapping data. Additionally, phase differences in time-frequency tiles and its stability over time may indicate whether a time-frequency tile represents an isolated point-source (no phase difference or stable phase difference over time) or diffuse sound or a mix of various point sources (typically non-zero, instable phase difference over time).

The channel level differences and phase differences may guide the adaptation of the audio elements. For example, the channel level differences for a time-frequency tile between various channel pairs may determine a correspondence with a segment of the first image, by matching channel positions relative to the image dimensions. This may be known, measured or assumed. Specifically, for example, a left channel may correspond to the left image boundary, a right channel to the right image boundary and a center channel to the middle of the image. This correspondence may be different for the first- and second image.

In this example, the channel level difference between left and center $$\left(CLD_{LC} = 10 * \log_{10}\left(\frac{\max(P_L, 10^{-6})}{\max(P_C, 10^{-6})}\right)\right)$$

with $P_L$ and $P_C$ being the signal power in the left- and center channel respectively) may correspond to a position in the left halve of the image. E.g. a $CLD_{LC}$ of −60 corresponds to the middle of the image, and a $CLD_{LC}$ of 60 corresponds to the left boundary. $CLD_{LC}$ values in between may be interpolated, linearly or non-linearly. With additional height channels a two dimensional position relative to the image may be derived.

The thus estimated position for each time-frequency tile can be matched to an object or segment in the image and the corresponding mapping data provided by the image remapper. The adaptation of the audio may follow the same mapping of e.g. position change of the object or segment. E.g. $\overline{b_2} = \overline{b_1} \cdot M$ where $\overline{b_1}$ and $\overline{b_2}$ represent the channel bed vectors of a time-frequency tile of the first- and second audio element respectively, and M a modification matrix that modifies the signal power in the channels' time-frequency tiles to achieve a desired CLD value for the second audio element.

In an example where $CLD_{LC1}$ corresponds to position $\overline{p_1}$ in the image, which according to the mapping data is moved to position $\overline{p_2}$ in the image, which corresponds to $CLD_{LC2}$, according to the interpolation scheme used above, the modifications $P_{L2} = \alpha_L \cdot P_{L1}$ and $P_{C2} = \alpha_C \cdot P_{C1}$ can be derived under the requirement that overall power remains equal: $P_{L1} + P_{C1} = P_{L2} + P_{C2}$.

$$\alpha_L = \frac{(P_{L1} + P_{C1}) \cdot 10^{CLD_{LC2}/10}}{P_{L1} \cdot 10^{CLD_{LC2}/10} + P_{C1} \cdot 10^{CLD_{LC1}/10}}$$

$$\alpha_C = \frac{(P_{L1} + P_{C1}) \cdot 10^{CLD_{LC1}/10}}{P_{L1} \cdot 10^{CLD_{LC2}/10} + P_{C1} \cdot 10^{CLD_{LC1}/10}}$$

If this is the only adaptation for this time-frequency tile, the adaptation matrix M for 5 channels (L, R, C, Ls, Rs) may be:

$$M = \begin{pmatrix} \sqrt{\alpha_L} & 0 & 0 & 0 & 0 \\ 0 & 1 & 0 & 0 & 0 \\ 0 & 0 & \sqrt{\alpha_C} & 0 & 0 \\ 0 & 0 & 0 & 1 & 0 \\ 0 & 0 & 0 & 0 & 1 \end{pmatrix}$$

If there are more adaptations, the individual adaptation matrices can be multiplied, e.g.: $M = M_{LC} M_{RC} M_{LLs} M_{RRs}$ In the described system, the content dependent non-uniform mapping is inherently a dynamic mapping as it is content dependent and thus will vary depending on the content of the image. The mapping is not a fixed or predetermined mapping but rather the mapping that is applied to the first image to generate the second image depends on the first image and is thus typically not known in advance. The actual mapping that is applied in the specific case and for this specific image can thus be described, and in the approach the image remapper 203 generates mapping data which describes the specific content dependent non-uniform mapping that is applied to the first image. The data may thus describe the specific mapping applied to this image thereby allowing the audio remapper 207 to perform an audio remapping that matches the image remapping. Thus, the mapping data describing the image mapping allows the audio remapping to by dynamic and adapt to the specific image aspect ratios.

It will be appreciated that there are many ways that the mapping data can describe the content dependent non-uniform mapping and that the specific approach used will depend on the preferences and requirements of the individual implementation and application. For example, the mapping data may describe how image/pixel positions in the first image are mapped to image/pixel positions in the second image. The mapping data may e.g. be given as absolute positions in the two images or as relative images.

When the audio remapper 207 receives this mapping data, it may remap the audio elements accordingly. For example, for an audio source that corresponds to an image object at a position that has not changed much, the audio remapper 207 may proceed to not make any spatial changes to the corresponding audio element. However, if the mapping data instead describes that for this specific image, the image position corresponding to the audio source has changed dramatically, the audio remapper 207 may proceed to make a corresponding change to the position of the corresponding audio element. For example, if the content dependent non-uniform mapping has shifted the corresponding position substantially further away from the middle towards the right edge of the second image, the audio remapper 207 may change the position of the corresponding audio element to be further towards the right.

Thus, in addition to performing a content dependent non-uniform mapping to an image, the image remapper 203 also generates mapping data which describes the specific mapping that is applied to the image. This mapping data is fed to the audio remapper 207 which can modify the spatial property of the audio elements based on the description provided by the mapping, i.e. the modifications of the spatial property can be adapted to fit the specific content dependent non-uniform mapping that was performed to provide the aspect ratio change between the first and second image. Of course, the exact mapping data (e.g. what is described and how it is described) and the specific adaptation of spatial properties is application and implementation specific and will depend on the results and properties that are desired in the specific embodiment.

In some embodiments the amount of adaptation may be further controlled by the corresponding phase difference and/or phase difference variation in the corresponding time-frequency tile or frequency band. E.g. when the corresponding phase difference is zero, the full adaptation is done, and the adaptation is reduced as the phase difference increases.

Alternatively or additionally to applying a spatial widening algorithm, a source separation algorithm (of which also a wide variety exists) may be used to extract individual sources together with directional information from the channel-based content. These extracted individual sources and their corresponding directional information may then be remapped in a similar way to that described above for audio objects.

Thus, in many embodiments, the audio remapper 207 may be arranged to change a spatial position for the first audio element from a position corresponding to an image position in the first image to an image position in the second image.

In many embodiments, the received data may include metadata which links audio elements with image objects. The audio remapper 207 can use this link information to determine the mapping that should be applied to the individual audio element. In other embodiments, no explicit link data may be provided and the apparatus may be arranged to analyze the received audiovisual data to link audio elements and image objects. For example, after identifying salient objects, the audio remapper 207 may for a given image object analyze the audio elements to determine an audio element that matches the properties expected for the image object. Specifically, the audio element which has an indicated position closest to the salient object in the first image may be selected. In some embodiments, the characteristics of the image object and the audio elements may further be taken into account. For example, if the image object is identified to correspond to a face (e.g. the image object may have been determined by face detection), the audio element may be selected as one that has properties that are indicative of speech.

In the apparatus of FIG. 2, the change of audio/video aspect ratio is associated with a change in the spatial properties of the associated spatial audio content. The audio content may be modified in order to maintain an improved quality of the overall experience. It has been found that the aspect ratio linked modification of the audio content provides a substantially improved user experience, especially for immersive media content, such as VR and 360-degree movie content.

The most straightforward approach would be to apply a linear remapping of the spatial positions of the audio elements according to the relationship between the original- and modified aspect ratio. However, in the apparatus of FIG. 2, a more advanced approach is used wherein content depending aspect ratio remapping is performed on the visual side and with this dynamic mapping furthermore controlling the audio side remapping. This may provide an improved effect and in particular may provide a more consistent user experience.

The approach may accordingly link the remapping of the audio elements directly to the non-linear remapping of the video image. For example, if the horizontal- and vertical positions x and y of a given pixel or visual object in the video image are remapped to positions ax and by, then the audio corresponding to the position (x,y) may be remapped to the modified position (ax,by) as well.

In the approach, spatially remapping of audio elements of an audiovisual content item may be performed dependent on a non-uniform content dependent video/image remapping operation that is carried out to adapt the aspect ratio of the video image to the aspect ratio of a display.

In many embodiments, the audio remapper 207 may additionally or alternatively be arranged to modify a spatial spread property of the first audio element in response to the mapping data. The spatial spread property may reflect the degree of localization of the audio element and thus the degree to which the rendered audio element is considered to originate from a single point. Spread can typically be indicated by size parameters or one or more radii, indicating the physical or acoustically perceived size or extent of an object. Alternatively it may be an immersion ratio or angle range for which the user is receiving or perceiving incoming sound waves. As another example, it may be a value indicating object diffuseness as a value, e.g., between 0 and 1, which the renderer translates into a rendering between a pure point-source rendering and a fully immersive diffuse rendering. Typically, this means rendering to multiple positions or multiple speakers. Larger spreads will require lower correlations between various rendered positions to avoid artefacts and improve naturalness.

The audio remapper 207 may thus be arranged to change the perceived width or diffusion for a given audio element.

For example, the spread of a given audio element may be achieved by rendering the object at multiple positions. E.g. by convolving the object signal with multiple HRTFs for binaural processing. Gains may be applied to the renderings at the various positions to vary the energy distribution spatially. Different implementations may make different trade-offs between rendering position range (maximum distance between rendering positions) and localization of spatial energy distribution by the gains. This approach typically works well for small spread values and rendering at multiple positions relatively close to each other, e.g. within 30 degrees angle as seen from the listener.

Other embodiments, typically for high quality rendering and large spread values, may generate multiple, mutually decorrelated (or partially decorrelated) versions of the object and render these to a range of locations dependent on the spread data.

Alternatively it may be achieved by applying a spatial widening algorithm to audio channels of the audio element. For an audio object, a decorrelated signal may for example be generated and the output signal (e.g. a binaural signal) may be generated as a combination of the decorrelated signal and the original signal.

The algorithm for modifying the spread of an audio element is adapted based on the mapping data provided from the image remapper 203. For example, if the corresponding visual object or segment of the image is stretched or compressed, the spread of the audio element may also be increased respectively reduced. This scenario will often occur for non-salient, background features of the scene.

Figure 3:
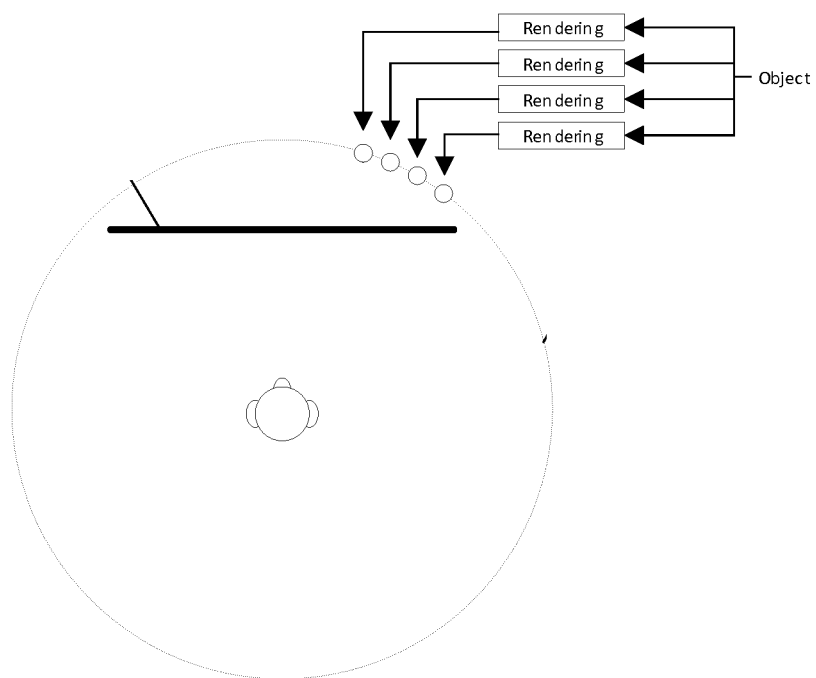
FIG. 3 illustrates an example of a rendering of an audio apparatus in accordance with some embodiments of the invention.
Figure 4:
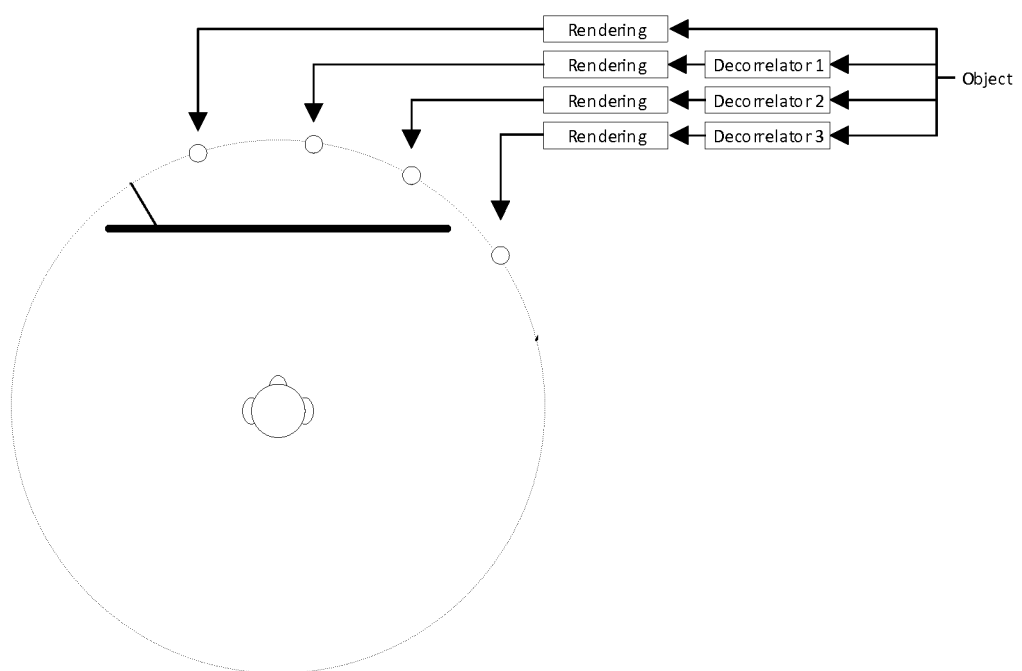
FIG. 4 illustrates an example of a rendering of an audio apparatus in accordance with some embodiments of the invention.

As a low complexity example, as illustrated in FIGS. 3 and 4, the apparatus may render an audio object as having a medium spread by rendering it from four different positions and render an audio object as having a large medium spread by rendering it from four different positions that are more spread out and may in addition add decorrelation between the different positions. The audio object in the second example will be perceived to have a much larger spread than in the first example.

In many embodiments, the spatial modification of the audio element may also depend on acoustic/audio properties of the audio elements, for example the audio properties may be evaluated to decide whether the spatial property should be changing and how this should be done. Thus, in many embodiments, the spatial modification of the audio elements may depend on a characteristic of the audio represented by the audio element.

In particular, in many embodiments, the spatial modification of a given audio element performed by the audio remapper 207 may depend on the degree of spatial spread of the audio element. Thus, the spatial modification may depend on the degree of localization or spatial extension of the audio element. This may for example be represented or estimated by the degree of diffuseness of the audio element. The more diffuse the audio rendered by the audio renderer 209 is, the less the audio source corresponding to this audio element will be perceived to be in one specific location and the more it will be perceived to be distributed across a larger area.

In some embodiments, the audio remapper 207 may be arranged to apply e.g. an increased change in position for a higher degree of spatial spread of the audio element. For example, an audio element which has a high degree of spread may be moved further to the side following an aspect ratio change in order to provide a wider spatial impression that may match the larger viewing angle. For example, a wider display may benefit from audio being generated that extends further to the side and with more audio sources being positioned to the side of the listener rather than in front. However, a higher consistency between audio and video is maintained if this increased width of the soundstage is achieved by audio sources that are not associated with specific, narrow, and well defined positions but rather with audio sources that are not directly linked to specific positions in the audio scene.

In many embodiments, the audio remapper 207 is arranged to reduce the level of change in the position for an audio element in response to an increasing degree of spatial spread for the audio element. This may for example be particularly suitable for audio elements that are directly linked to image objects that are moved by the image remapper 203. For example, a specific, well defined, and localized audio object may be moved to directly correspond to the new position. However, if the image object is linked to an audio element which is more diffuse and spread out over a larger domain, the audio remapper 207 may reduce the position change. For example, the new position may be determined to be somewhere between the original position and the modified position. This may in many scenarios provide an improved perception as it may provide an improved compromise between the original sound stage and the modified sound stage. This may for example reflect that there is a reduced perceptual link between a specific image object and the sound linked to that image object for an increasing spread of the audio.

Indeed, in many embodiments, the audio remapper 207 may be arranged to select whether to apply a modification to the spatial property or not dependent on the degree of spatial spread. For example, for audio elements that have measure of spread which is below a given threshold may be considered to be sufficiently closely linked to a specific scene object such that when the image object corresponding to the scene object is moved by the image remapper 203, the audio element is moved correspondingly in order to maintain the close correspondence between the image object and the audio object, i.e. between the visual and audio experience. However, for an audio element for which the spread measure is above the threshold, no position modification may be introduced by the audio remapper 207. This may result in the audio element being rendered to be perceived to be from the original position rather than from the new position of the image object but as the position perception will be diffuse and imprecise any inconsistency between the visual and audio side may be negligible and may be outweighed by the likelihood that it will provide an improved consistency between audio elements, such as specifically between ambient audio sources. Thus, it may provide an improved consistency of the rendered audio stage.

In some embodiments, the audio remapper 207 may be arranged to modify the spatial property in response to whether the first audio element is designated as background audio or not. For example, the audio elements may be divided into two categories corresponding to foreground objects and to background objects, and the audio elements of the two categories may be processed differently. As a low complexity example, all audio elements categorized as being foreground objects may be repositioned to directly match the repositioning of corresponding image elements whereas no position change may be applied to audio elements that are categorized as background elements. This may in many scenarios provide an improved perceptual experience.

Thus, a distinction may be made between "foreground" and "background" audio elements. "Foreground" audio elements may be determined as distinct, localized audio elements, whereas "background" audio elements may be determined as non-localized audio elements such as "ambience" sounds, or background music. For example, in an object-based audio use case, a distinction can be made between highly localized (point) sources that can be considered to correspond to "foreground" elements, and non-localized (i.e. diffuse) objects that can be considered to correspond to "background" elements.

In other embodiments, the categorization as "foreground" or "background" audio elements may be based on explicit indications in the received bitstream, for example metadata may be provided for each audio element indicating whether this is a foreground or background audio object. Indeed, a number of standardized audio formats already provide metadata elements for signaling that an audio object is a point- or diffuse sound source, which may be used as an indication of whether the audio object is a foreground or background audio object.

As mentioned, the audio remapper 207 may simply consider that only foreground audio elements should be subjected to possible position remapping whereas the spatial distribution of the background sounds/audio elements may be kept unmodified. It will be appreciated that in other embodiments, other adaptations may be used, e.g. a widening effect or increased diffusion may be added to background audio elements but not to foreground audio elements.

In some embodiments, the audio remapper 207 may be arranged to modify the spatial property in response to an audio type of the first audio element. The audio type may specifically be determined as a type from a group comprising at least an audio object, an audio channel, and a higher order ambisonics audio element.

For example, audio objects are often used to represent individual and specific audio sources whereas audio channels and ambisonics are used to represent more ambient audio including a plurality (and typically many) different audio sources. Therefore, audio objects may e.g. in some embodiments be subjected to a change in position corresponding to the aspect ratio change whereas audio channels and/or ambisonics elements may be left unmodified.

As another example, in some embodiments the audio remapper 207 may be arranged to apply a non-uniform spatial widening to audio elements that are audio channels whereas no spatial widening is applied to audio objects.

In a hybrid use case where audio element may comprise both audio objects and -channels and/or scene-based (e.g. Higher Order Ambisonics) audio elements, a distinction may be made between, on the one hand, objects ("foreground"), and, on the other hand, channels/scene-based elements ("background"). As a refinement of this, for the audio objects, a distinction may in addition be made between point- and diffuse sources as described above. Likewise, scene-based elements such as Higher Order Ambisonics elements may additionally be separated into "primary" and "ambient" components. These different categories may then be processed differently by the audio remapper 207.

For example, audio objects may be rendered according to the mapping data for their corresponding first position relative to the image, whereas audio channels, such as the left- and right front channels, are rendered at larger or smaller angles than their nominal positions dependent on an average or maximum position change resulting from the aspect ratio change. Higher Order Ambisonics (HOA) elements may be rendered unmodified or with minimal spatial stretch or -compression to avoid artefacts. The HOA elements may be converted to directional components for rendering with HRTFs or speaker rendering algorithms such as VBAP. The front-stage directional component signals may be rendered at wider or narrower angles in order to stretch or compress the front-stage in accordance with the aspect ratio change. If the HOA directional components have enough spatial resolution, the rendering position updates may be varied to match the spatial remapping variation of the image.

The rendered positions of the directional components outside the front-stage may be left unaltered or rendered at decreasing wider or narrower angles, similar to the front-stage, to achieve a spatial fade-out of the stretch/compression effect towards positions further away from the front-stage.

The front-stage may be defined as the part of the 3D space that is visible to the user. For example the part that is displayed on the 2D display or HMD.

In some embodiments, the audio remapper 207 may be arranged to modify the spatial property in response to whether the first audio element is linked to an image object in the first image or not. For example, if the data stream comprises metadata that indicates that a given audio element is linked to a specific image object (or even just that it has a corresponding image object in the image without any further indication of what that image is), the audio remapper 207 may modify the spatial position of the audio element such that it follows the image segment that has a corresponding position in the original input image. However, for audio elements that are not linked to objects in the image, the audio remapper 207 may proceed to not modify any position but possibly increase the spatial spread/diffusion. This may be beneficial as an increased spread diffuses the localization of the object and therefore reduces the likelihood of a mismatch with a potential visual counterpart that is modified by the image remapper.

In some embodiments, the modification by the audio remapper 207 may be based on an explicit indication in the bit stream that a specific audio element (e.g. an audio object) is linked to a specific visual element (e.g. a visual object) in the visual image. In this way, it is possible to identify audio elements that should be modified according to a possible remapping of the linked visual object. So, in this case an audio element may be modified and remapped only if the linked visual element is remapped by the intelligent video upscaling algorithm performed by the image remapper 203. Audio elements that are not linked to any visual element, or audio elements that are linked to visual elements that are not remapped by the intelligent video upscaling algorithm of the image remapper 203, may not be remapped in this example.

In a variation of this example, the explicit indication in the bit stream may, less specifically, simply indicate that an audio element is "screen related" (implying that an upscaling of the visual image should result in a similar remapping of this audio element).

In some embodiments, the audio remapper 207 may be arranged to modify the spatial property in response to a property of the display used for rendering the second image. In addition to indirectly adapting the processing dependent on the aspect ratio of the display via the mapping data from the image remapper 203, the audio remapper 207 may also consider other properties of the display, such as specifically the size of the display.

For example, in many embodiments, the audio remapper 207 may be provided with data indicating the size of the display. If the display is a small display intended for viewing at some distance, the audio remapper 207 may be arranged to not increase the spatial spread (or may even reduce this) even for background and ambient audio. However, if the display is large, the audio remapper 207 may increase the spatial spread (e.g. increase diffuseness or perform spatial widening) substantially. Thus, for a small display, an audio experience may be provided which is perceived to be less expansive than for a large display thereby matching the visual experience.

In some embodiments, the audio remapper 207 may be arranged to modify the spatial property in response to a viewer position relative to the display. The audio remapper 207 may for example adapt the processing to reflect the orientation and position of the user relative to the display such that the rendered audio is perceived to come from the appropriate position. For example, if the user is located to the side of the display and is viewing the display at an angle, the positioning of the audio sources may be amended to reflect this.

As another example, the distance from the viewer position to the display may be considered. For example, for a user sitting close to the display, the position of most audio elements, including many more diffuse audio elements, may be modified to follow the corresponding changes in the image position. This may allow a closer correspondence between the visual experience and the audio experience as even more diffuse sounds are perceived to originate from the "right" part of the display. However, for a user that is positioned further from the display, it may not be possible to differentiate audio from different parts of the display and it may be more attractive to generate a user experience that provides a larger audio scene than one that corresponds directly to the display size. Therefore, spatial widening and other algorithms for increasing the spatial spread of more ambient audio may be applied by the audio remapper 207 resulting in a more immersive experience.

The display size and/or the viewer position may for example be used to estimate or determine a viewport or aperture for the viewer. The audio remapper 207 may adapt the processing based on this viewport. The adaptation may additionally or alternatively be dependent on the audio element position with respect to the viewport of the first image.

For example, audio elements that are positioned outside the original viewport may not be modified whereas audio element within the viewport are modified to reflect the changes in the aspect ratio remapping. For example, audio objects that are positioned behind or above the user may not be modified. Another example is an ambience audio component that is present all around the user, e.g. an HOA ambience element. This does not require that the ambience component is the same in all directions. It could for example be an HOA element that contains a full 3D recording of a café background ambience). It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. An apparatus, comprising:
   a receiver circuit,
      wherein the receiver circuit is arranged to receive audiovisual data for a scene,
      wherein the audiovisual data comprises audio data for the scene
      and image data for at least a first image of the scene,
      wherein the audio data describes a plurality of audio elements for the scene,
      wherein the audio elements correspond to audio sources in the scene,
      wherein the first image has a first aspect ratio;
   an image remapper circuit,
      wherein the image remapper circuit is arranged to perform a content dependent non-uniform mapping of the first image to a second image,
      wherein the second image has a second aspect ratio,
      wherein the second aspect ratio is different from the first aspect ratio,
      wherein the image remapper circuit is arranged to generate mapping data,
      wherein the mapping data describes the content dependent non-uniform mapping; and
   an audio remapper circuit,
      wherein the audio remapper circuit is arranged to replace a first audio element of the plurality of audio elements by a second audio element,
      wherein the second audio element is generated by modifying a spatial property for the first audio element based on the mapping data.

2. The apparatus of claim 1, wherein the audio remapper circuit is arranged to generate the second audio element by changing a spatial position for the first audio element from a position corresponding to an image position in the first image to an image position in the second image.

3. The apparatus of claim 1, wherein the audio remapper circuit is arranged to generate the second audio element by modifying a spatial spread property of the first audio element in response to the mapping data.

4. The apparatus of claim 1, wherein the audio remapper circuit is arranged to generate the second audio element by modifying the spatial property in response to an audio property of the first audio element.

5. The apparatus of claim 4, wherein the audio property comprises a degree of spatial spread for the first audio element.

6. The apparatus of claim 5, wherein the spatial property includes a position of the first audio element and the audio remapper circuit is arranged to generate the second audio element by modifying the position of the first audio element, wherein the audio remapper circuit is arranged to produce less of a position change between the second audio element and the first audio element in response to a greater degree of spatial spread for the first audio element.

7. The apparatus of claim 5, wherein the audio remapper circuit is arranged to select whether to apply the modification to the spatial property or not dependent on the degree of spatial spread.

8. The apparatus of claim 1, wherein the audio remapper circuit is arranged to modify the spatial property in response to an audio type of the first audio element.

9. The apparatus of claim 1, wherein the audio remapper circuit is arranged to modify the spatial property in response to whether the first audio element is linked to an image object in the first image.

10. The apparatus of claim 1, wherein the audio remapper is arranged to modify the spatial property dependent on whether the first audio element is designated as background audio.

11. The apparatus of claim 1, wherein the audio remapper circuit is arranged to modify the spatial property in response to a property of a display for rendering the second image.

12. The apparatus of claim 1, wherein the audio remapper circuit is arranged to modify the spatial property in response to a viewer position relative to a display for rendering the second image.

13. A method, comprising:
   receiving audiovisual data for a scene,
      wherein the audiovisual data comprises audio data for the scene
      and image data for at least a first image,
      wherein the audio data describes a plurality of audio elements for the scene,
      wherein the first image has a first aspect ratio;
   performing a content dependent non-uniform mapping of the first image to a second image,
      wherein the second image has a second aspect ratio,
      wherein the second aspect ratio is different from the first aspect ratio,
   generating mapping data,
      wherein the mapping data describes the content dependent non-uniform mapping,
      and
   replacing a first audio element of the plurality of audio elements by a second audio element, wherein the second audio element is generated by modifying a spatial property for the first audio element based on the mapping data.

14. A computer program stored on a non-transitory medium, wherein the computer program when executed on a processor performs the method as claimed in claim 13.

15. The apparatus of claim 6, wherein the audio remapper circuit is arranged to select whether to apply the modification to the spatial property or not dependent on the degree of spatial spread.

16. The method of claim 13, further comprising generating the second audio element by modifying a spatial position property of the first audio element in response to the mapping data.

17. The method of claim 13, further comprising generating the second audio element by changing a spatial position for the first audio element from a position corresponding to an image position in the first image to an image position in the second image.

18. The method of claim 13, wherein generating the second audio element comprises modifying a spatial spread property of the first audio element in response to the mapping data.

19. The method of claim 13, wherein generating the second audio element by modifying the spatial property in response to an audio property of the first audio element.

20. The method of claim 19, wherein the audio property comprises a degree of spatial spread for the first audio element.

21. The method of claim 20, further comprising reducing a position change between the second audio element and the first audio element for an increasing degree of spatial spread for the first audio element.

22. The method of claim 20, further comprising selecting whether to apply the modification to the spatial property or not dependent on the degree of spatial spread.

23. The method of claim 21, further comprising selecting whether to apply the modification to the spatial property or not dependent on the degree of spatial spread.

24. The method of claim 13, further comprising modifying the spatial property in response to an audio type of the first audio element.

25. The method of claim 13, further comprising modifying the spatial property in response to whether the first audio element is linked to an image object in the first image.

26. The method of claim 13, further comprising modifying the spatial property dependent on whether the first audio element is designated as background audio.

27. The method of claim 13, further comprising modifying the spatial property in response to a property of a display for rendering the second image.

28. The method of claim 13, further comprising modifying the spatial property in response to a viewer position relative to a display for rendering the second image.

* * * * *